Sept. 4, 1962 C. H. PETERS 3,052,788
ELECTRIC HEATER CONTROL
Filed March 9, 1961
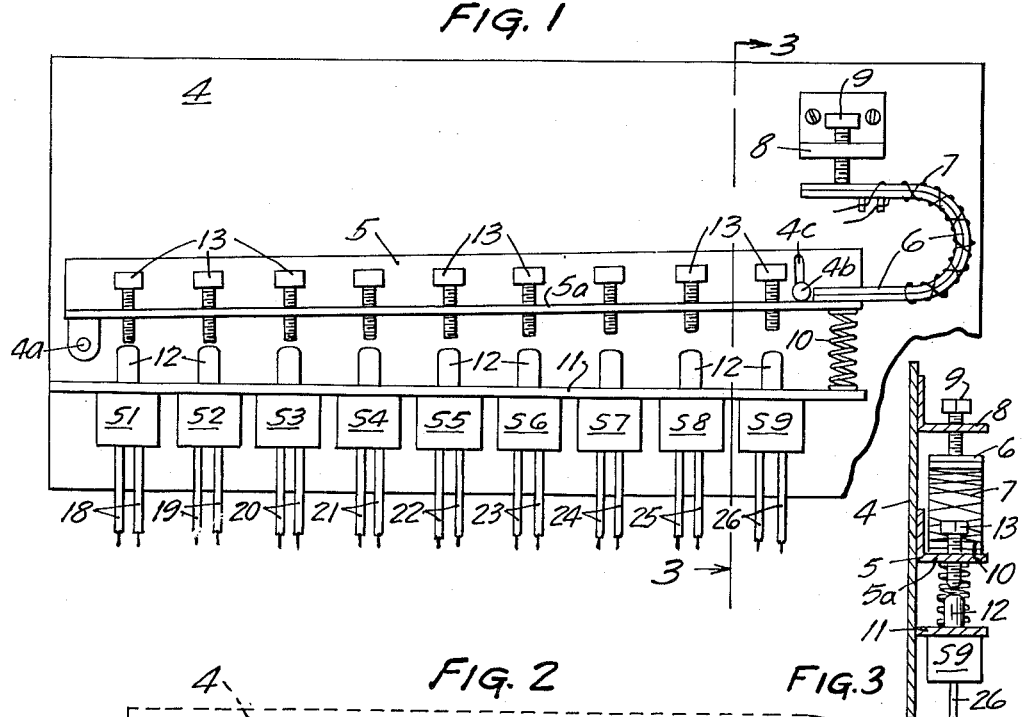
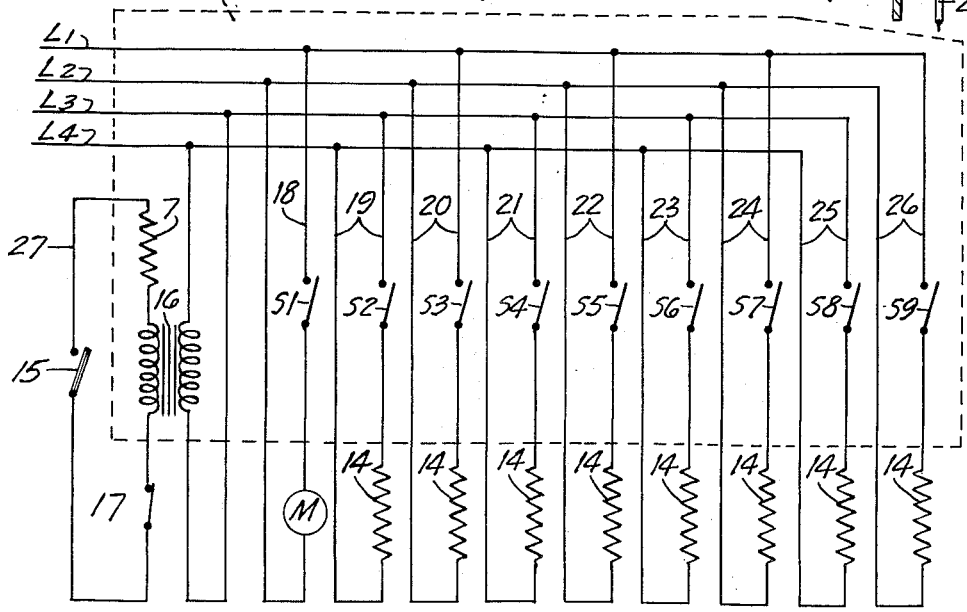
INVENTOR
CLAUDE H. PETERS
BY John E. Strufer
ATTORNEY

United States Patent Office 3,052,788
Patented Sept. 4, 1962

3,052,788
ELECTRIC HEATER CONTROL
Claude H. Peters, 2720 Highway 61, St. Paul, Minn.
Filed Mar. 9, 1961, Ser. No. 94,463
5 Claims. (Cl. 219—20)

This invention relates to controls for electric heating systems of the type having a plurality of electric heating elements included in independently energizable electric circuits, and particularly to thermostat responsive controls for such systems.

The principal object of my invention is to provide a simple, low cost and reliable control for sequentially energizing and deenergizing a number of electric heating, ventilating or air conditioning units, including a thermostat master switch located at a control point.

A particular object is to provide for a heating system of the class described, a thermally actuable switch actuator which is movable under control of a thermostat to sequentially energize a number of heating, blower or air conditioning circuits.

The invention also includes certain novel structural features which will be more fully pointed out in the following specification and claims.

Referring to the accompanying drawing which illustrates one embodiment of my invention, by way of example and not for the purpose of limitation:

FIGURE 1 is a front elevational view showing my improved control mounted on a vertical support or panel;

FIG. 2 is a wiring diagram for an electric heating system with which my device may be used as a control, and FIG. 3 is a cross sectional view taken on the line 3—3 of FIG. 1.

As shown in FIGS. 1 and 3, the control is mounted on a panel 4 and has an elongated bar 5 which is pivotally connected at 4a to the panel 4 so that the bar is movable to various angular positions. A thermally actuable member 6, preferably of the bi-metallic power element type, has a heating coil 7 disposed in heating relation thereto and is operatively connected to the bar 5 at a point removed from the pivot 4a. The coil 7 may be wound around the member 6, or otherwise disposed in heating relation to it. As shown, the member 6 is U-shaped and is rigidly connected at one end to a flange 5a extending along the bar 5. The other end of the member 6 is held in contact with an adjustable stop screw 9 mounted on a bracket 8 connected to the panel 4. The screw 9 is threaded in the bracket 8 and the bar 5 and member 6 are biased upwardly toward the adjusting screw 9 by a coiled spring 10 which is confined between the lower side of the flange 5a and an elongated support 11 projecting from the panel 4. The support 11 extends longitudinally of the bar 5 in spaced relation thereto and carries at its lower side a row of snap switches indicated respectively at S1–S9 inclusive. These switches are of the push button type, each having a plunger 12 projecting above the support 11 for engagement with an adjustable contact member 13 threaded in the flange 5a of the bar 5. By adjusting the extent of each member 13 projecting below the flange 5a the lower ends of the members 13 may be selectively spaced from the several plungers 12 so that when the bar is oscillated downwardly the normally open snap switches will be sequentially closed. Snap switches of load capacity suitable for my purposes are commercially available with current ratings up to 20 amperes.

When the coil 7 is energized, the member 6 is heated and caused to bend downwardly, thereby changing the angle of the bar 5 from its pivot 4a and compressing the spring 10. This angular movement of the bar 5 about the pivot 4a continues until one or more of the contact members 13 contact and actuate selected switch plungers 12 in the predetermined sequence. The right end portion of the bar 5 is held in sliding contact with the panel 4 by means of a stud 4b having a head engaging the front face of the bar and a shank portion which extends through an elongated arcuate slot 4c in the bar. Angular movement of the bar is thereby limited to the degree required to actuate the snap switches.

Referring to the wiring diagram, FIG. 2, power lines are indicated at L1, L2, L3 and L4, and independently energizable electric heating elements 14 are severally connected in electrical series with the snap switches S2–S9 inclusive. In a typical installation, the heating elements 14 are suitably mounted in an electric furnace so that the thermal unit output of the furnace is proportional to or a factor of the number of heating elements 14 that may be energized at any particular time. Forced air heating systems have blowers operated by electric motors. A circuit for such a motor M is shown in series with the switch S1 and conductors 18 extending from the lines L1 and L2 respectively. Some of the heating elements 14 may be connected across lines L1 and L2 and others across lines L3 and L4 to balance the peak load in a domestic heating system wherein current is supplied to each heating element at 120 volts or 240 volts from a conventional single phase 240-volt power source, or, if wiring from the power source permits, all elements 14 and motor M may be connected across lines L1 and L2 only.

Current at a lower voltage may be supplied from a circuit 27 which includes the heating coil 7, a thermostat switch 15, and the secondary coil of a transformer 16 having its primary coil connected across the line L3—L4. Also shown in this circuit is a normally closed safety switch 17 which is thermally actuated to open the thermostat circuit when the temperature at the furnace control point reaches a predetermined safe maximum. Usually the thermostat and switch 15 are located in the room or other space to be heated. Conductors of the circuits under control of the snap switches S2–S9 respectively are severally indicated at 19–26.

In operation, when the thermostat switch 15 is open the bar 5 is retained in an angular position, such as that indicated, wherein all of the switch contact members 13 are out of contact with the push buttons 12 of the switches S1–S9, and the heating coil 7 is deenergized. When the thermostat switch 15 closes in response to a demand for heat at the control point, the coil 7 is energized and causes the thermal actuator member 6 to move the right end of the bar 5 toward the switches S1–S9 and to close one or more of these switches in a sequence which is selected by suitable adjustment of the contact members 13. As each snap switch S2–S9 closes, one of the heating elements 14 is energized and the motor M for operating the blower may also be energized.

If the demand for heat at the thermostat continues for a prolonged period of time the resulting heating of the member 6 will cause the bar 5 to be moved downward to a predetermined maximum angle from its retracted position, thereby closing all of the snap switches S1–S9 and furnishing the peak load output condition. At any time when the demand for heat is satisfied, the opening of the thermostat switch 15 will stop the heating of the actuator member 6 and the subsequent cooling of this member will reverse the direction of movement of the bar 5 and cause the opening of the closed snap switches sequentially.

It will thus be evident that only a sufficient number of the heating elements 14 are energized at any time to meet the demand for heat. By providing a multiplicity of the heating elements in independently energizable circuits under control of the snap switches, the current demand for each individual heating circuit is minimized. Consequently a majority of the domestic heating installations do no require relays for the individual heating circuits. The adjustable contact members 13 afford means for selectively operating the several snap switches in any desired order or sequence. Once the individual members 13 have been set to the desired sequence control positions, the sequence is automatically maintained. The control may also be made more or less sensitive to changes in temperature at the thermostat by adjusting the screw 9 engaging the fixed end of the actuator member 6. Since operation of the member 6 may be influenced by the ambient air temperature to some extent, the effect of ambient temperature may be minimized by location of this control member in an air current of controlled temperature such as that supplied by the return air duct or blower intake duct.

It will be evident that the cost of my control is extremely low because of its simplicity, ease of manufacture and ease of adjustment for use in systems of a wide range of capacities. Moreover, by dividing the power load between a mutiplicity of individually energizable heating circuits, each under control of a snap switch, I obviate the need for relays in most installations and effect substantial savings in the current used by energizing only a sufficient number of heating elements to supply the demand at any time.

Other advantageous characteristics of my control are its silence and dependability in operation, the ease with which it may be repaired and maintained and its ready adjustability to effect any desired sequence of operation of the several electronically energizable elements.

I claim:

1. An electric heating system control comprising, an elongated bar, means pivotally supporting said bar for angular movement, a thermally actuable member operatively connected to said bar for changing the angle thereof, a heating coil disposed in heating relation to said member, a thermostat switch, circuit means including said thermostat switch for energizing said coil, a plurality of independently energizable heating circuits each including an electric heating element, snap switches severally included in said heating circuits and spaced in a row along said bar, and means for operatively connecting the several snap switches to said bar at points spaced along the same whereby to actuate the several snap switches sequentially in response to changes in the angular position of said bar.

2. A control in accordance with claim 1 in which said means for operatively connecting the several snap switches to said bar comprise adjusting screws each having a threaded connection with said bar and having an end disposed to actuate one of said switches to closed position.

3. In an electric heating system of the type having a plurality of electric heating elements included in independently energizable heating circuits each including an electric heating element, a control comprising an elongated bar, means pivotally supporting said bar for angular movement; a thermally actuable member operatively connected to said bar for changing the angle thereof, a heating coil disposed in heating relation to said member, a thermostat switch, circuit means including said thermostat switch and said heating coil for energizing said coil; push button snap switches severally included in said heating circuits and spaced in a row along said bar, and switch actuating means projecting from said bar at points spaced along the same and severally disposed to actuate one of said snap switches when said bar is in a predetermined angular position.

4. In an electric heating system of the type having a plurality of electric heating elements included in independently energizable heating circuits each including an electric heating element, a control comprising normally open snap switches severally included in said heating circuits, thermally actuable means disposed to close and release said snap switches sequentially, a heating coil disposed in heating relation to said thermally actuable means, a thermostat, and circuit means including said thermostat and said heating coil for energizing said coil.

5. A control in accordance with claim 4 in which said thermally actuable means includes an adjustable switch actuating member for each of said snap switches, and means for securing the several actuating members in selected positions in relation to the several snap switches whereby to vary the sequence of operation of the snap switches.

References Cited in the file of this patent

UNITED STATES PATENTS

| | | |
|---|---|---|
| 510,889 | Butz | Dec. 19, 1893 |
| 1,910,721 | Taylor et al. | May 23, 1933 |
| 2,352,930 | Anderson | July 4, 1944 |
| 2,568,700 | Armstrong | Sept. 25, 1951 |